(12) United States Patent
Garrec et al.

(10) Patent No.: US 11,320,531 B2
(45) Date of Patent: May 3, 2022

(54) METHOD AND SYSTEM FOR NEUTRALIZING THE EFFECT OF VIBRATIONS IN A ROTARY-WING AIRCRAFT FOR AIRBORNE DOPPLER RADAR

(71) Applicant: THALES, Courbevoie (FR)

(72) Inventors: Patrick Garrec, Merignac (FR); Rodolphe Cottron, Brest (FR); Yoan Veyrac, Merignac (FR)

(73) Assignee: THALES, Courbevoie (FR)

(*) Notice: Subject to any disclaimer, the term of this patent is extended or adjusted under 35 U.S.C. 154(b) by 160 days.

(21) Appl. No.: 16/716,184

(22) Filed: Dec. 16, 2019

(65) Prior Publication Data

US 2020/0200890 A1 Jun. 25, 2020

(30) Foreign Application Priority Data

Dec. 20, 2018 (FR) ...................................... 1873374

(51) Int. Cl.
*G01S 13/58* (2006.01)
*G01S 7/02* (2006.01)
(Continued)

(52) U.S. Cl.
CPC ............ *G01S 13/585* (2013.01); *G01S 7/023* (2013.01); *G01S 13/003* (2013.01); *G01S 13/60* (2013.01)

(58) Field of Classification Search
None
See application file for complete search history.

(56) References Cited

U.S. PATENT DOCUMENTS 3,778,830 A * 12/1973 Joseph ...................... G01S 7/40
342/149
3,859,660 A * 1/1975 Augustine ............... G01S 13/60
342/114
(Continued)

FOREIGN PATENT DOCUMENTS

GB 2435129 A * 8/2007 ........... H01Q 21/061
WO WO2009/142554 A1 * 11/2009 ............. H04B 17/12

OTHER PUBLICATIONS

Shippers, et al., "Vibrating antennas and compensation techniques Research in NATO/RTO/SET 087/RTG 50", 2007 IEEE Aerospace Conference, pp. 1-13, Mar. 3, 2007.
(Continued)

*Primary Examiner* — Bernarr E Gregory
(74) *Attorney, Agent, or Firm* — BakerHostetler

(57) ABSTRACT

A method for active neutralization of the effect of the vibrations of a rotary-wing aircraft for a monostatic Doppler radar includes a first step of measuring and temporally extrapolating the vibration modes at the transmitting-receiving radar antenna, using a 3-axis vibration sensor, fixed to the antenna and near the phase centre of the antenna; then a second step of estimating the expected movements of the transmitting-receiving antenna or of the first transmitting antenna and the second receiving antenna; then a third step of compensating the expected movements of the transmission radar antenna in the transmission chain or in the reception chain of the radar transmitter, wherein the projection of the movement vector of the phase centre O on an aiming direction is calculated to determine the value of the compensation phase shift to be applied.

18 Claims, 9 Drawing Sheets

(51) Int. Cl.
*G01S 13/00* (2006.01)
*G01S 13/60* (2006.01)
*G01S 7/00* (2006.01)

(56) References Cited

U.S. PATENT DOCUMENTS

| | | | | |
|---|---|---|---|---|
| 4,617,567 | A * | 10/1986 | Chan | G01S 13/9019 |
| | | | | 342/25 A |
| 4,924,229 | A | 5/1990 | Eichel et al. | |
| 5,012,249 | A * | 4/1991 | Chan | G01S 13/9019 |
| | | | | 342/25 A |
| 5,623,270 | A * | 4/1997 | Kempkes | H01Q 1/005 |
| | | | | 342/174 |
| 5,952,955 | A * | 9/1999 | Kennedy | G01S 7/4021 |
| | | | | 342/25 F |
| 2011/0260908 | A1* | 10/2011 | New | G01S 7/023 |
| | | | | 342/59 |
| 2018/0083718 | A1* | 3/2018 | Ward | H04B 15/04 |

OTHER PUBLICATIONS

Gao, et al., "Paired echo suppression algorithm in helicopter-borne SAR imaging", IET Radar, Sonar & Navigation, vol. 11, Issue 11, p. 1605-1612, Nov. 1, 2017.

Pfitzner, et al., "FPGA based architecture for real-time SAR processing with integrated motion compensation", Conference Proceedings of 2013 Asia-Pacific Conference on Synthetic Aperture Radar (APSAR), pp. 521-524, Sep. 23, 2013.

* cited by examiner

METHOD AND SYSTEM FOR NEUTRALIZING THE EFFECT OF VIBRATIONS IN A ROTARY-WING AIRCRAFT FOR AIRBORNE DOPPLER RADAR

CROSS-REFERENCE TO RELATED APPLICATIONS

This application claims priority to foreign French patent application No. FR 1873374, filed on Dec. 20, 2018, the disclosure of which is incorporated by reference in its entirety.

FIELD OF THE INVENTION

The present invention relates to a method and system for neutralizing the effect of vibrations in a rotary-wing aircraft for airborne Doppler radar.

The technical field of the invention is that of Doppler processing and the field of application is mainly that of helicopter radars.

BACKGROUND

The effect of the movements of the platform aircraft on the operation of an airborne radar is a well-known problem. In particular, these movements have a considerable effect in the field of coherent radar processing, for example the extraction of the Doppler velocity.

In the case of a rotary-wing aircraft, the movements of the rotors create significant vibrations in the overall structure of the platform. The vibration modes of the platform have an effect on the coherent processing that is carried out. The typical frequency range of the vibrations is from several hertz to several tens of hertz. The Doppler processing requires an integration based on the phase coherence of the signal, which increases in length as the desired velocity resolution becomes finer. The movements of the radar antenna caused by the vibrations of the platform create parasitic effects in this processing, which increase with the length of the integration time.

The precise determination of the ground velocity of the platform, and the detection of slow targets which are difficult to separate from ground or sea return signals, are applications that are particularly affected.

Compensation for the movements of the platform is particularly important in the technique of synthetic aperture radar (more widely known by the abbreviation SAR, for "Synthetic Aperture Radar" in English). In order to reconstruct correctly the images from different viewing angles, the movements of the platform must be precisely known. These measurements are usually obtained from an inertial navigation unit on the platform, and can be used to model the movement of the platform for the purpose of coherent processing. Imperfections in the correction of the platform movement can be corrected subsequently by algorithmic processing of the images obtained. The best-known method is a PGA ("Phase Gradient Autofocus" in English) algorithm, such as that described in US patent application 4924229 A, entitled "Phase correction system for automatic focusing of synthetic aperture radar", which can be used to refocus the image on the assumption of a static scene.

For Doppler processing, the platform movement compensation is also usually carried out by means of an inertial navigation unit. This requires a unit operating at a sufficient frequency to sample the vibratory movements correctly, while having adequate sensitivity.

The measurements of the platform's unit must also enable the movements of the phase centre of the radar antennas to be deduced. This depends on the areas where the radar antennas are installed and on the mechanical coupling between the inertial navigation unit and the radar antennas, and this is a drawback of this method.

SUMMARY OF THE INVENTION

A first technical problem resolved by the invention is that of proposing a method for neutralizing the effect of the vibrations of a rotary-wing aircraft for an airborne Doppler radar which avoids the need to use an inertial navigation unit for its implementation and avoids constraining the choice of the areas of installation of the radar antenna(s).

A second technical problem resolved by the invention is that of proposing a method for neutralizing the effect of the vibrations of a rotary-wing aircraft for an airborne Doppler radar in which the control of the coupling between the vibration sensor(s) and the radar antenna(s) is improved.

For this purpose, the invention proposes a method of active neutralization of the effect of the vibrations of a rotary-wing aircraft for a monostatic Doppler radar or a bistatic radar, the monostatic Doppler radar comprising:
a transmitting-receiving radar antenna sharing the same phase centre O, and
a radar transmission chain, connected to a transmission input of the transmitting-receiving antenna of the monostatic Doppler radar; and
a radar reception chain, connected to a receiving output of the transmitting-receiving antenna of the monostatic Doppler radar; or, the bistatic Doppler radar comprising:
a first transmitting radar antenna having a transmission phase centre O1 and a second receiving radar antenna, remote from the first transmitting antenna, having a reception phase centre O2; and
a radar transmission chain, connected to a transmission input of the first transmitting radar antenna of the bistatic Doppler radar; and
a radar reception chain, connected to a reception output of the second receiving radar antenna of the bistatic radar.

The active neutralization method is implemented by an active neutralization system comprising:
a three-dimensional vibration sensor for each radar antenna, fixed to said antenna, and near its phase centre O, O1, O2, or a single three-dimensional vibration sensor, shared by the first transmitting radar antenna and the second receiving radar antenna and near a phase centre O1, O2, while the transmitting and receiving antennas are close to one another and strongly coupled mechanically; and
a device for estimating the movement of each vibration sensor and for neutralizing their movement.

The active neutralization method is characterized in that it comprises:
a first step of measuring and temporally extrapolating the vibration modes at the transmitting-receiving antenna or at the first transmitting antenna and the second receiving antenna near their associated phase centre(s) O, O1 and O2; then
a second step of estimating the expected movements of the transmitting-receiving antenna or of the first transmitting antenna and the second receiving antenna; then
a third step of compensating the expected movements of the radar antenna(s) in the transmission chain or in the receiving chain.

According to particular embodiments, the method of active neutralization of the effect of the vibrations of a rotary-wing aircraft for an airborne Doppler radar comprises one or more of the following characteristics, considered separately or in combination:

the third step of compensating for the expected movements of the phase centre(s) O, O1, O2 comprises a fourth step of calculating at least one projection of the movements in an aiming direction of the transmitting-receiving antenna or of the second receiving antenna, and a fifth step of determining at least one compensation phase shift corresponding to an aiming direction;

for each measurement sensor, the first step of measuring and temporally extrapolating the vibration modes of the vibration sensor comprises, executed successively, a sub-step of bandpass filtering of measured triaxial acceleration signals, a sub-step of complex frequency analysis of the vibration modes, and a sub-step of interpolation of the acceleration profiles by image band filtering, and temporal extrapolation to immediately subsequent instants; and the second step of estimating the expected movements comprises, executed successively, a sub-step of integration of accelerations to velocities, and a sub-step of integration of velocities to expected movements;

the active neutralization method defined above further comprises a step of learning for each boresight axis, executed on the ground or in flight on known fixed beacons, and configured to provide a model for refining the corrections to be applied in the radar transmission chain or in the radar reception chain, which allows for the variations of the vibrations correlated with the engine speed and the velocity of the rotary-wing aircraft;

the Doppler radar is a monostatic radar comprising a transmitting-receiving radar antenna with the same phase centre O; and the active neutralization system comprises a three-dimensional vibration sensor, fixed to the transmitting-receiving radar antenna and near its phase centre; and the vibration modes of the radar antenna are measured by the vibration sensor in the first step of measurement and temporal extrapolation; and the expected movements of the phase centre O of the transmitting-receiving radar antenna are estimated in the second step; and the compensation for the expected movements of the phase centre O of the transmitting-receiving antenna is carried out during the generation of the waveform in the radar transmission chain, by calculating the projection of the expected movements of the phase centre O on the aiming direction of the transmitting-receiving radar antenna, then determining a compensation phase shift $\Delta\varphi$ corresponding to the aiming direction equal to twice the amplitude dp of the expected movements divided by the wavelength $\lambda$ of the radar;

the Doppler radar is a bistatic radar comprising a first transmitting radar antenna having a transmission phase centre O1 and a second receiving radar antenna, remote from the first transmitting antenna and having a reception phase centre O2; and the active neutralization system comprises a first three-dimensional vibration sensor, fixed to the first transmitting radar antenna and near its transmission phase centre O1, and a second three-dimensional vibration sensor, fixed to the second receiving radar antenna and near its reception phase centre O2; and the vibration modes of the first transmitting radar antenna and of the second receiving radar antenna, respectively, are measured, in the first step of measurement and temporal extrapolation, by the first vibration sensor (160) and the second vibration sensor respectively; and the expected movements of the transmission phase centre O1 of the first transmitting radar antenna and the expected movements of the reception phase centre O2 of the second receiving radar antenna are estimated in the second step; and the compensation for the expected movements of the transmission phase centre O1 and of the reception phase centre O2 is carried out during the generation of the waveform in the radar transmission chain, by calculating the projection of the expected movements of the transmission phase centre on the aiming direction of the first transmitting radar antenna and the projection of the expected movements of the reception phase centre on the aiming direction of the second receiving antenna, then determining a compensation phase shift $\Delta\varphi$ corresponding to the respective aiming directions of the first transmitting radar antenna and of the second receiving radar antenna as a function of the respective movements of the transmission phase centre and of the reception phase centre and of the wavelength $\lambda$ of the radar signal; a step of learning for each boresight axis is executed on the ground or in flight on known fixed beacons, the learning step being configured to provide a model for refining the corrections to be applied during the generation of the waveform in the radar transmission chain which allows for the variations of the vibrations correlated with the engine speed and the velocity of the rotary-wing aircraft;

the above active neutralization method comprises a step of detecting signals from jammers that are not correlated with the vibrations of the rotary-wing aircraft, the step of detecting the signals from jammers being implemented in parallel with the compensation for the radar echoes received, correlated with the movements of the antenna(s).

the Doppler radar is a monostatic radar comprising a transmitting-receiving radar antenna with the same phase centre O; and the active neutralization system comprises a three-dimensional vibration sensor, fixed to the transmitting-receiving radar antenna and near its phase centre O; and the vibration modes of the radar antenna are measured by the vibration sensor in the first step of measurement and temporal extrapolation; and the expected movements of the phase centre of the transmitting-receiving radar antenna O are estimated in the second step; and the compensation for the expected movements of the phase centre O of the transmitting-receiving antenna is carried out during the demodulation of the radar echo(es) received in the radar reception chain, by calculating the projection of the expected movements of the phase centre O on the aiming direction of the transmitting-receiving radar antenna, then determining a compensation phase shift $\Delta\varphi$ corresponding to the aiming direction equal to twice the amplitude dp of the expected movements of the phase centre O corresponding to the aiming direction diffused by the wavelength $\lambda$ of the radar signal;

the Doppler radar is a bistatic radar comprising a first transmitting radar antenna having a transmission phase centre O1 and a second receiving radar antenna, remote from the first transmitting antenna and having a reception phase centre O2; and the active neutralization system comprises a first three-dimensional vibration sensor, fixed to the first transmitting radar antenna and near its transmission phase centre O1, and a second three-dimensional vibration sensor, fixed to the second receiving radar antenna and near its reception phase centre O2; and the vibration modes of the first transmitting radar antenna and of the second receiving radar antenna, respectively, are measured, in the first step of measurement and temporal extrapolation, by the first vibration sensor and the second vibration sensor respectively; and the expected movements of the transmission phase centre of the first transmitting radar antenna and the expected movements of the reception phase centre of the second receiving radar antenna are estimated in the second step; and the compensation for the expected movements of the transmission phase centre and of the reception phase centre is carried out during the demodulation of the radar echo(es) in the radar reception chain, by calculating the projection of the expected movements of the transmission phase centre O1 on the aiming direction of the first transmitting antenna and the projection of the expected movements of the reception phase centre O2 on the aiming direction of the second receiving antenna, then determining a compensation phase shift $\Delta\varphi$ corresponding to the respective aiming directions of the first transmitting radar antenna and of the second receiving radar antenna as a function of the respective movements of the transmission phase centre O1 and of the reception phase centre O2 and of the wavelength $\lambda$ of the radar signal; a step of learning for each boresight axis is executed on the ground or in flight on known fixed beacons, the learning step being configured to provide a model for refining the corrections to be applied during the demodulation of the radar echo(es) received in the radar reception chain which allows for the variations of the vibrations correlated with the engine speed and the velocity of the rotary-wing aircraft; the Doppler radar is a monostatic radar comprising a transmitting-receiving radar antenna with the same phase centre O; and the active neutralization system comprises a first sub-system for measurement and estimation of the components of the expected movement vector of the phase centre O of the transmitting-receiving antenna, including the three-dimensional vibration sensor, and, in series, a second sub-system for neutralization of a predetermined whole number N of estimated expected movements of the phase centre O, associated with N aiming directions in reception mode of the transmitting-receiving antenna, included in the processing module for the demodulated and digitized signal of the reception chain; and the vibration modes of the radar antenna are measured by the vibration sensor in the first step of measurement and temporal extrapolation; and the expected movements of the phase centre O of the transmitting-receiving radar antenna are estimated in the second step; and the compensation for the expected movements of the phase centre of the transmitting-receiving antenna is carried out in the processing module for the demodulated and digitized signal of the reception chain, by calculating the projection of the expected movements of the phase centre O on the N aiming direction of the transmitting-receiving radar antenna, then determining for each of the N aiming directions of the transmitting-receiving antenna in reception mode an associated compensation phase shift $\Delta\varphi$ which is a function of the amplitude dp of the expected movements of the phase centre corresponding to the aiming direction and the wavelength $\lambda$ of the radar carrier;

the Doppler radar is a bistatic radar comprising a first transmitting radar antenna having a transmission phase centre O1 and a second receiving radar antenna, remote from the first transmitting antenna and having a reception phase centre O2; and the active neutralization system comprises a first sub-system for measurement and estimation of the components of the expected movement vector of the phase centre O1 of the transmitting antenna and of the components of the expected movement vector of the phase centre O2 of the receiving antenna, including the first and second three-dimensional vibration sensors, and, in series, a second sub-system for neutralization of a predetermined whole number N of estimated expected movements of the reception phase centre O2, associated with N aiming directions in reception mode of the receiving antenna and the estimated expected movements of the transmission phase centre O1 associated with the aiming direction in transmission mode of the transmitting antenna, included in the processing module for the demodulated and digitized signal of the reception chain; and the vibration modes of the first transmitting radar antenna and of the second receiving radar antenna, respectively, are measured, in the first step of measurement and temporal extrapolation, by the first vibration sensor and the second vibration sensor respectively; and the expected movements of the transmission phase centre O1 of the first transmitting radar antenna and the expected movements of the reception phase centre O2 of the second receiving radar antenna are estimated in the second step; and the compensation for the expected movements of the transmission phase centre O1 and of the reception phase centre O2 is carried out in the processing module for the demodulated and digitized signal of the reception chain, by calculating the projection of the expected movements of the transmission phase centre O1 on the transmission aiming direction of the first transmitting antenna and the projection of the expected movements of the reception phase centre O2 on the N aiming directions of the second receiving antenna; then determining, for each of the N aiming directions of the transmitting-receiving antenna in reception mode, an associated compensation phase shift $\Delta\varphi$ which is a function of the amplitude dp of the expected movements of the reception phase centre O2 corresponding to the aiming direction, of the amplitude of the expected movements of the transmission phase centre O1, and of the wavelength $\lambda$ of the radar carrier;

a step of learning for each boresight axis is executed on the ground or in flight on known fixed beacons, the learning step being configured to provide a model for refining the corrections to be applied in the signal processing module of the reception chain for processing the radar echo(es) received in the radar reception chain which allows for the variations of the vibrations correlated with the engine speed and the velocity of the rotary-wing aircraft.

The invention also proposes a system for active neutralization of the effect of the vibrations of a rotary-wing aircraft for a monostatic Doppler radar or a bistatic radar;

the monostatic Doppler radar comprising: a transmitting-receiving radar antenna sharing the same phase centre O, and a radar transmission chain connected to a transmission input of the transmitting-receiving antenna of the monostatic radar; and a radar reception chain connected to a reception output of the transmitting-receiving antenna of the monostatic radar; or the bistatic Doppler radar comprising: a first transmitting radar antenna having a transmission phase centre O1 and a second receiving radar antenna, remote from the first transmitting antenna, having a reception phase centre O2; and a radar transmission chain connected to a transmission input of the first transmitting radar antenna of the bistatic radar; and a radar reception chain connected to a reception output of the second receiving radar antenna of the bistatic radar.

The system for active neutralization of the effect of the vibrations of a rotary-wing aircraft for a monostatic Doppler radar or a bistatic radar is characterized in that it comprises: a three-dimensional vibration sensor for each radar antenna, fixed to said antenna and near its phase centre O, O1 and O2; and a device for estimating the movement of each vibration sensor and for neutralizing their movement; the at least one vibration sensor and the device for estimating the movement of each vibration sensor and for neutralizing their movement being configured for:

in a first step, measuring and temporally extrapolating the vibration modes at the transmitting-receiving antenna or at the first transmitting antenna and the second receiving antenna near their associated phase centre(s); then in a second step, estimating the expected movements of the transmitting-receiving antenna or of the first transmitting antenna and the second receiving antenna; then in a third step, compensating for the expected movements of the radar antenna(s) in the transmission chain or in the receiving chain.

According to particular embodiments, the system for active neutralization of the effect of the vibrations of a rotary-wing aircraft for an airborne Doppler radar comprises one or more of the following characteristics, considered separately or in combination:

the device for estimating the movements of each vibration sensor and for neutralizing their movement is configured, in the third step of compensating for the expected movements, for: calculating at least one projection of the expected movements in an aiming direction of the transmitting-receiving antenna or of the second receiving antenna, and then determining at least one compensation phase shift in the transmission chain or the reception chain, corresponding to an aiming direction;

the device for estimating the movements of each vibration sensor and for neutralizing their movement is configured for: in the first step of measuring and temporally extrapolating the vibration modes of the vibration sensor, executing band-pass filtering of measured triaxial acceleration signals, then executing a complex frequency analysis of the vibration modes, then executing an interpolation of the acceleration profiles by image band filtering, and then executing a temporal extrapolation to immediately subsequent instants; and, in the second step of estimating the expected movements, executing an integration of the expected accelerations to expected velocities, and then executing an integration of the expected velocities to expected movements;

the device for estimating the movements of each vibration sensor and for neutralizing their movement is also configured for implementing a learning step for each boresight axis, executed on the ground or in flight on known fixed beacons, in which a model is calculated for refining the corrections to be applied in the radar transmission chain or in the radar reception chain, the model allowing for the variations of the vibrations correlated with the engine speed and the velocity of the rotary-wing aircraft.

BRIEF DESCRIPTION OF THE DRAWINGS

The invention will be more readily understood from a perusal of the following description of a number of embodiments, provided solely by way of example, with reference to the drawings, in which.

DETAILED DESCRIPTION

In general terms, a method of active neutralization of the effect of the vibrations of a rotary-wing aircraft is based on the measurement of the vibratory movements of the antenna radar, executed by a 3-axis accelerometer fixed mechanically to the radar antenna and near its phase centre.

Figure 1:
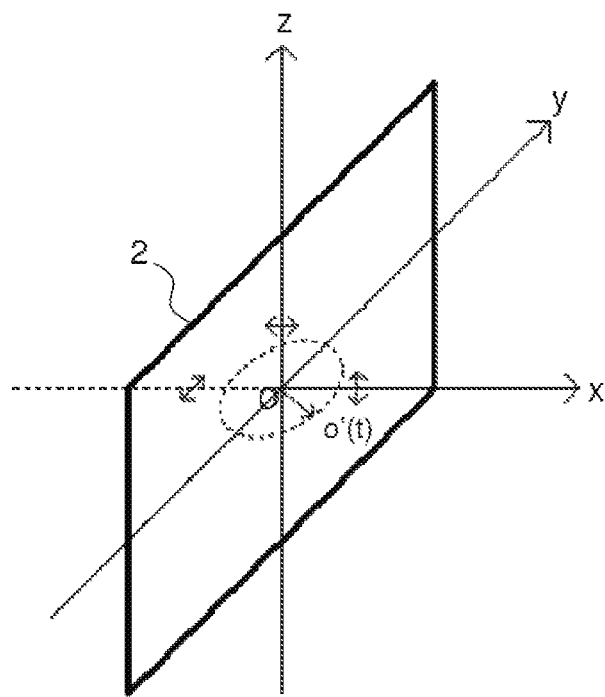
FIG. 1 is a view of the vibratory movements of the phase centre around the rest point.

As shown in FIG. 1, the movements of the phase centre of a radar antenna 2, represented in a simplified form, are established (vector $\overrightarrow{OO'}(t)$) on the basis of the components in acceleration.

Figure 2:
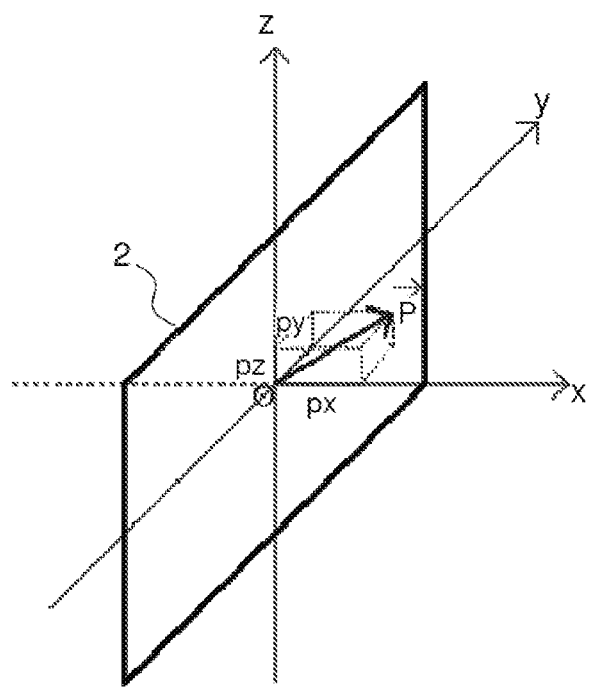
FIG. 2 is a view of the aiming direction of the antenna, projected in the reference frame of the antenna.

The Doppler effect is sensitive to radial movements relative to the aiming direction of the antenna. In the case of an active antenna, this direction $\overrightarrow{OP}$ is not necessarily aligned with the normal of the antenna, as shown in FIG. 2.

The various components of the vibratory movements are projected on the aiming direction given by the vector $\overrightarrow{OP}$, by scalar product $\overrightarrow{OO'} \cdot \overrightarrow{OP}$.

According to the invention, these radial movements relative to the aiming direction $\overrightarrow{OP}$ are translated into a phase shift $\Delta\phi$ relative to the wavelength $\lambda$ of the carrier.

In general terms, the corresponding phase shift $\Delta\phi$ is then compensated in the radar transmission chain Tx or the radar reception chain Rx.

Figure 3:
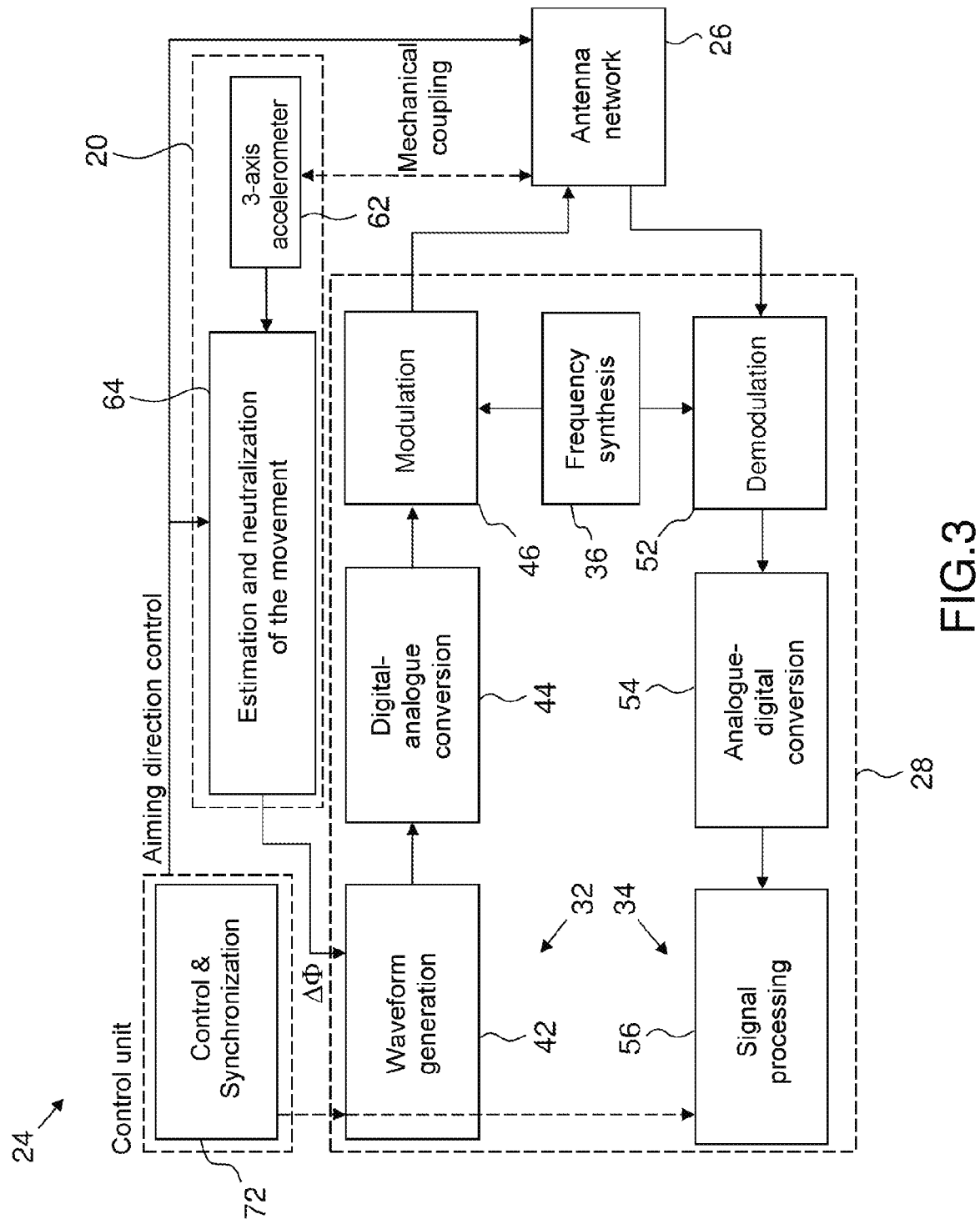
FIG. 3 is a view of the architecture of a monostatic airborne Doppler radar, incorporating a system for active neutralization of the vibrations according to a first embodiment of the invention.
Figure 4:
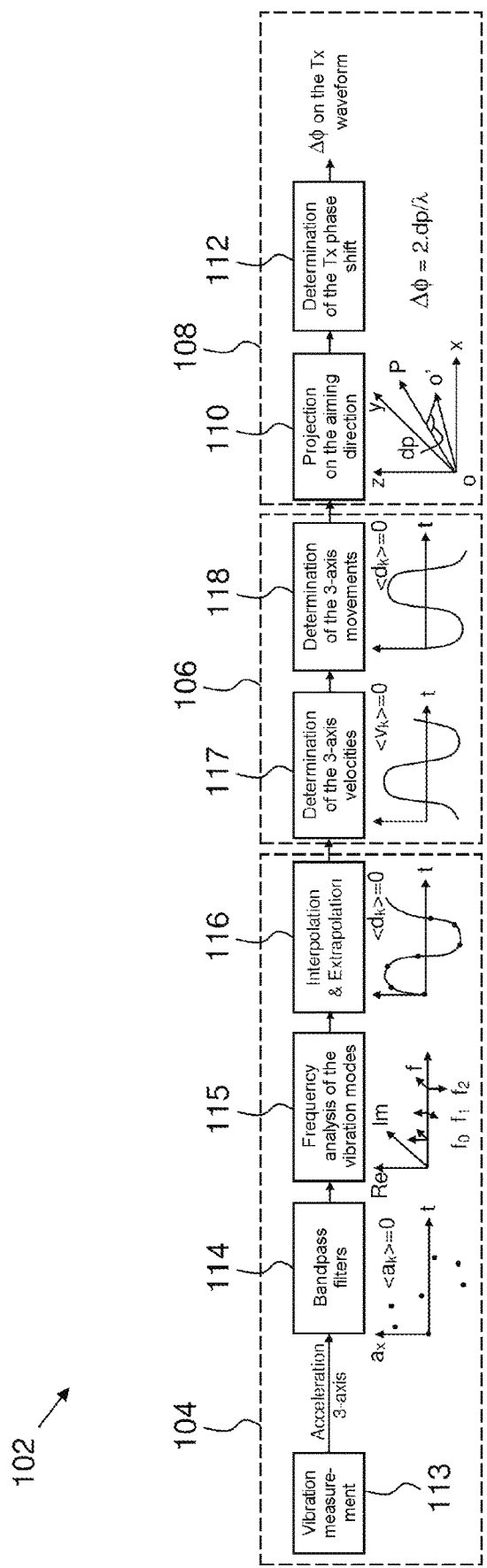
FIG. 4 is a view of a flow diagram of a method of active neutralization of the effect of the vibrations of a rotary-wing aircraft according to a first embodiment of the invention, implemented by the system for active neutralization of the vibrations described in FIG. 3.

According to FIGS. 3 and 4 and a first embodiment, the corresponding phase shift $\Delta\phi$ is then compensated during the generation of the waveform in the transmission chain Tx, with allowance for the outward and return path of the signal, the antenna being considered to be immobile during this outward and return period. Thus, for a given aiming direction $\overrightarrow{OP}$, the Doppler effect created by the vibrations is neutralized upstream of the signal generation. No further processing is required for receiving the signal.

According to FIG. 3 and a first embodiment, a system for active neutralization 20 of the effect of the vibrations of a rotary-wing aircraft (not shown) for an airborne Doppler radar is integrated in this case into a monostatic Doppler radar 24.

The monostatic Doppler radar 24 comprises a transmitting-receiving radar antenna 26, which in this case takes the form of an antenna network, having the same phase centre, and comprises a radar transmitter-receiver 28, connected to said transmitting-receiving radar antenna 26.

The radar transmitter-receiver 28 comprises a radar transmission chain 30 and a radar reception chain 32 which share a frequency synthesis unit 34 during the transposition of the signal radar to its carrier in transmission mode or during the conversion of the radar echoes into an analysis band for processing.

The radar transmission chain 30 comprises, connected in series, a module 42 for the digital generation of the transmission waveform Tx, a digital-analogue converter DAC 44, and a modulator 46 for modulating the radar signal to its transmission carrier Tx at the wavelength λ, the output of the modulator 46 being connected to an input terminal of the transmitting-receiving radar antenna 26.

The radar reception chain 32 comprises, connected in series, a demodulator 52 for demodulating the radar echoes received via the transmitting-receiving antenna 26, an analog-digital converter ADC 54 and a processing module 56 for processing the signal in an analytical processing band.

The system for active neutralization 20 comprises, in this case, a three-dimensional vibration sensor 62, fixed to the transmitting-receiving radar antenna 26 and near the phase centre O of said antenna 26, and a device 64 for estimating the movement of the phase centre O of the transmitting-receiving radar antenna 26 and for neutralizing said movement during the generation of the radar transmission waveform Tx.

The radar 24 also comprises a radar control unit 72, configured for controlling and synchronizing the various tasks of the radar, and in particular for sending an aiming direction control signal to the transmitting-receiving radar antenna 26 and to the device 64 for estimating the movement of the phase centre O of the transmitting-receiving radar antenna 26 and neutralizing said movement.

According to FIG. 4 and the first embodiment, the method of active neutralization 102 of the effect of the vibrations of a rotary-wing aircraft for a Doppler radar is implemented by the system for active neutralization 20 of the effect of the vibrations of the rotary-wing aircraft, and comprises the following steps, executed in succession:
  a first step 104 of measuring and temporally extrapolating the vibration modes at the transmitting-receiving antenna near its phase centre;
  a second step of estimating 106 the expected movements of the phase centre O of the transmitting-receiving radar antenna;
a third step 108 of compensating for the expected movements of the phase centre of the transmitting antenna relative to a given aiming direction, carried out during the generation of the transmission waveform Tx in the radar transmission chain 32, by calculating (in the fourth step 110) the projection of the expected movements of the phase centre on the given aiming direction of the receiving radar antenna, then determining (in the fifth step 112) a compensation phase shift Δϕ corresponding to the aiming direction equal to twice the amplitude dp of the expected movements divided by the wavelength λ of the radar.

The first step 104 consists in measuring 113 the accelerations of a point near the phase centre O of the transmitting-receiving antenna by means of the vibration sensor, then isolating 114 the vibration components in the spectrum of the various movements, using bandpass filters selecting the fundamental frequencies and harmonics of the vibrations caused by the rotors of the aircraft. Then, on the basis of the sampled and filtered measurements, a frequency analysis is performed 115 to find the complex spectral component of the vibratory movements, along the three axes X, Y, Z of the transmitting-receiving antenna. This analysis can be used to make an interpolation 116 of the acceleration profiles for each filtering of the image bands. It can also be used to extrapolate 116 the sequence of these profiles at the immediately subsequent instants, on the assumption of locally periodic movements.

In the second step 106, the velocity profiles vx, vy, vz along the three axes X, Y, Z are found by integration 117 of the accelerations ax, ay, az. The velocity components vx, vy, vz corresponding to the vibrations are assumed to be periodic with a zero mean. This assumption makes it possible to determine the initial velocity which appears in the integration of the acceleration. In the same way, an additional integration 118 makes it possible to find the movement profiles px, py, pz along the three axes X, Y, Z relative to the rest point.

In the fourth step 110, the vector of instantaneous movement $\vec{dp}$ of the phase centre O is projected on the aiming direction $\vec{OP}$ of the transmitting antenna by scalar product $\vec{dp} \cdot \vec{OP}$. The resulting movement dp is converted to a corrective phase shift Δϕ to be applied in the digital synthesis of the radar waveform that is transmitted.

Thus the extrapolation of the accelerations, and ultimately of the movements of the antenna associated with the vibrations, makes it possible to anticipate the location of the phase centre O of the transmitting-receiving antenna at the moment when the waveform will be transmitted, and thus to apply the phase shift Δϕ during the synthesis of the waveform which precedes the transmission.

In the case of a bistatic Doppler radar, a 3-axis accelerometer may be arranged to measure the phase centre of each of the antennas. The compensation phase shift at transmission is then calculated on the basis of the respective movements of the antennas.

Figure 5:
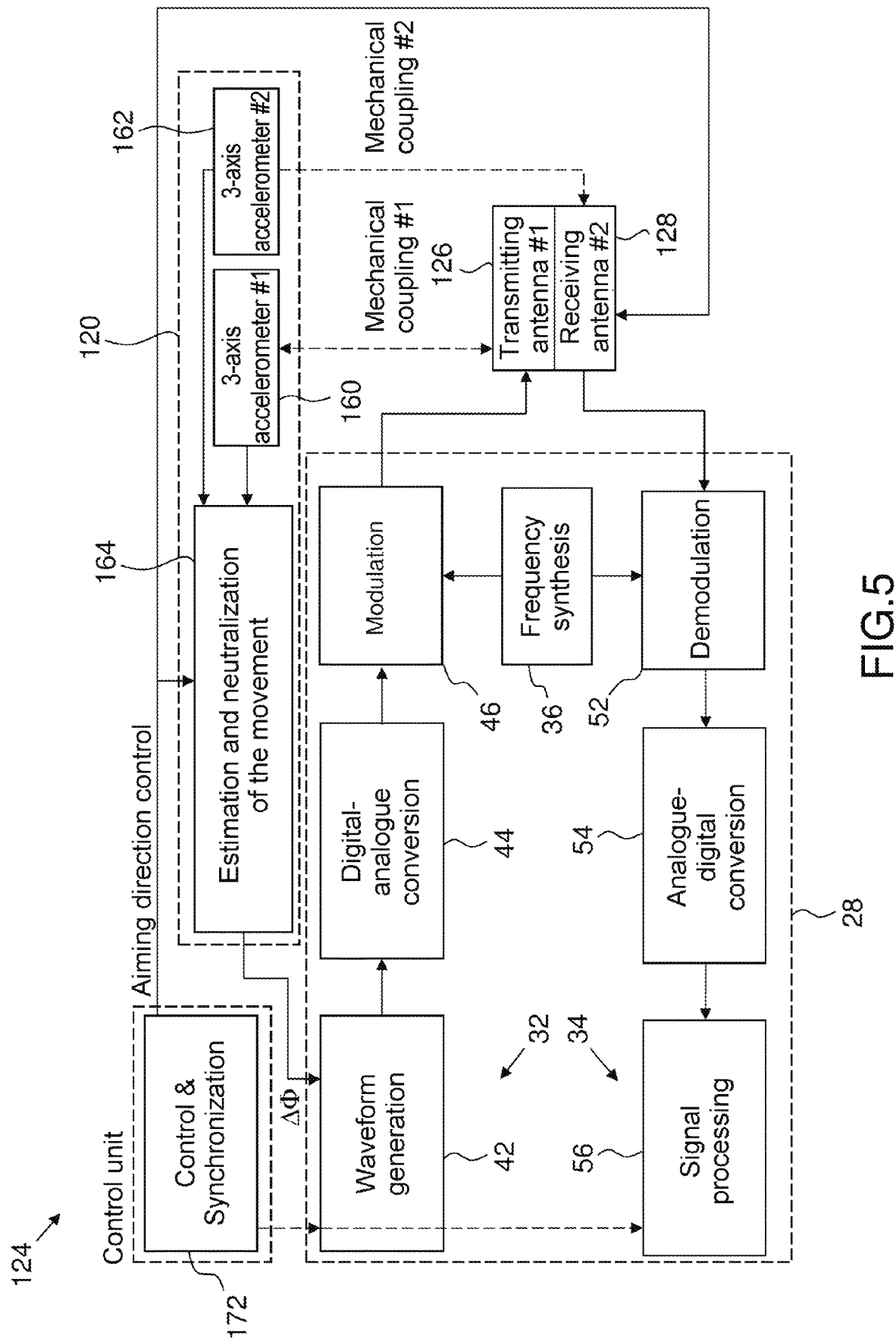
FIG. 5 is a view of the architecture of a bistatic airborne Doppler radar, incorporating a system for active neutralization of the vibrations according to a variant of the first embodiment of FIG. 3.

According to FIG. 5 and a variant of the first embodiment of the active neutralization system and method of FIGS. 3 and 4, a system for active neutralization 120 of the effect of the aerofoil vibrations for a Doppler radar, derived from the active neutralization system 20, is configured to be integrated with a bistatic airborne Doppler radar 124.

The bistatic Doppler radar 124 differs from the monostatic Doppler radar 24 in that it comprises a first transmitting radar antenna 126 having a first transmission phase centre O1 and a second receiving radar antenna 128 having a second phase centre O2.

The first active neutralization system 120 differs from the active neutralization system 20 of FIG. 3 in that it comprises two vibration sensors instead of a single one, with one vibration sensor for each antenna.

The active neutralization system 120 comprises a first three-dimensional vibration sensor 160, fixed to the first transmitting radar antenna by a first rigid mechanical coupling and near its transmission phase centre O1, and comprises a second three-dimensional vibration sensor 162, fixed to the second receiving radar antenna 128 by a second rigid mechanical coupling and near its reception phase centre O2.

The active neutralization 120 also differs from the active neutralization system 20 of FIG. 3 in that it comprises a device for estimating and neutralizing the respective movements of the first transmission phase centre O1 of the first transmitting radar antenna 126 and of the second phase centre O2 of the second receiving radar antenna 128.

The active neutralization system 120 is configured for implementing the first and second steps applied to each antenna.

The vibration modes of the first transmitting radar antenna 126 and of the second receiving radar antenna 128 respectively are measured by the first vibration sensor 160 and the second vibration sensor 162 respectively, and are temporally extrapolated.

The expected movements of the transmission phase centre O1 of the first transmitting radar antenna 126 and the expected movements of the reception phase centre O2 of the second receiving radar antenna 128 are estimated by the device 164 for estimating and neutralizing the respective movements of the first and second phase centres O1, O2, using the algorithm of the second step of FIG. 4.

The expected movements of the first transmission phase centre O1 and of the second reception phase centre O2 are compensated during the generation of the waveform in the radar transmission chain by means of the device 164 for estimating and neutralizing the movements:

by calculating the projection of the expected movements of the first transmission phase centre O1 on the aiming direction of the first transmitting antenna 126 and the projection of the expected movements of the second reception phase centre O2 on the aiming direction of the second receiving antenna 128; then by determining a compensation phase shift $\Delta\phi$ corresponding to the respective aiming directions of the first transmitting antenna 126 and of the second receiving antenna 128, on the basis of the respective movements of the transmission phase centre O1 and of the second reception phase centre O2, and of the wavelength $\lambda$ of the radar signal carrier.

It should be noted that the bistatic Doppler radar 124 comprises a control unit 172, adapted to a bistatic Doppler radar and configured to control and synchronize the various tasks of the bistatic radar 124, particularly sending a control signal for the respective aiming directions to the first transmitting radar antenna 126, to the second receiving antenna 128, and to the device 164 for estimating the respective expected movements of the transmission phase centre O1 of the first transmitting radar antenna 126 and of the second phase centre O2 of the second receiving antenna 128, and for neutralizing said movements.

It should be noted that a neutralization system using two vibration sensors, such as the neutralization system 120 described in FIG. 5, may be used for any form of bistatic radar. The most usual form of bistatic radar, called "strongly bistatic", is a bistatic radar in which the transmitting and receiving antennas are physically separated and fairly distant from one another, and/or weakly coupled mechanically, with each requiring the use of a different 3D vibration sensor. A particular form of bistatic radar, called "weakly bistatic", is a bistatic radar in which the transmitting and receiving antennas are physically separated but close to one another in terms of their respective phase centres, and strongly coupled mechanically. This embodiment, called "weakly bistatic", may use a single shared 3D vibration sensor, positioned near one or other of the centres, and may operate in a similar manner to a monostatic radar in terms of the function for neutralizing the effects of the aircraft's vibrations.

Figure 6:
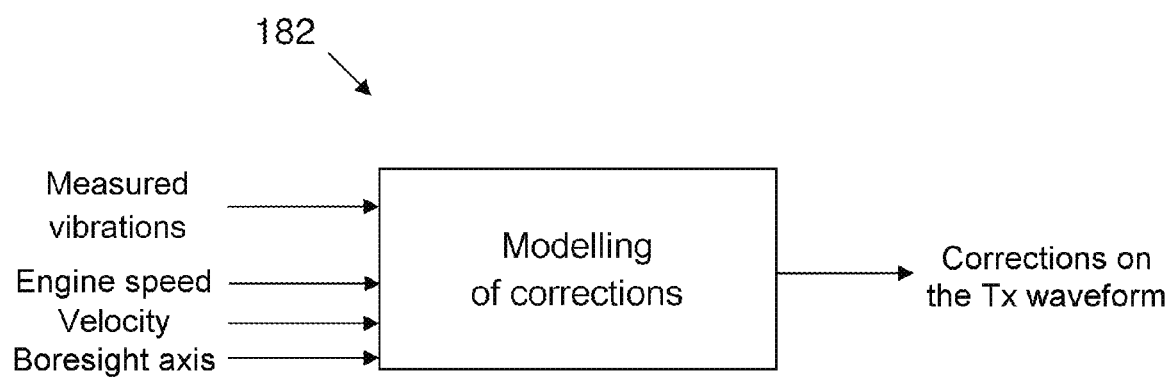
FIG. 6 is a view of a unit for modelling the phase corrections of the Doppler radar signal, refined with respect to the allowance for the engine speed and the velocity of the aircraft, the modelling being calculated during a learning step.

According to FIG. 6, a learning system 182 for each boresight axis may be implemented and integrated into the active neutralization systems 20, 120 of FIGS. 3 and 5 to allow for the variations of the aircraft's vibrations, by integrating the engine speed of the rotary-wing aircraft, which are correlated with the velocity of the platform. Continual refinement may thus be carried out to improve the measurements of the vibration sensors.

When used, this modelling can reduce the quality requirements for the accelerometer sensors.

Thus a low-performance sensor may be used and improved by implementing this learning function by means of a learning step.

The learning function may be performed on the ground or in flight on known fixed beacons. These may be false Doppler beacons having a frequency very close to the carrier. This learning may take place at different engine speeds to achieve optimal vibration cancellation.

The active neutralization system and method described in FIGS. 3 to 5 may be used in the context of counter-countermeasures (CCM). Since the vibrations of the radar antennas are compensated in transmission, the echoes received by the radar are correlated with the movements of the antennas and are automatically compensated. However, signals received from jammers are not correlated with these vibrations. The effect of the vibrations will therefore appear for these jamming signals at the end of the Doppler processing, enabling them to be identified as jamming.

Figure 7:
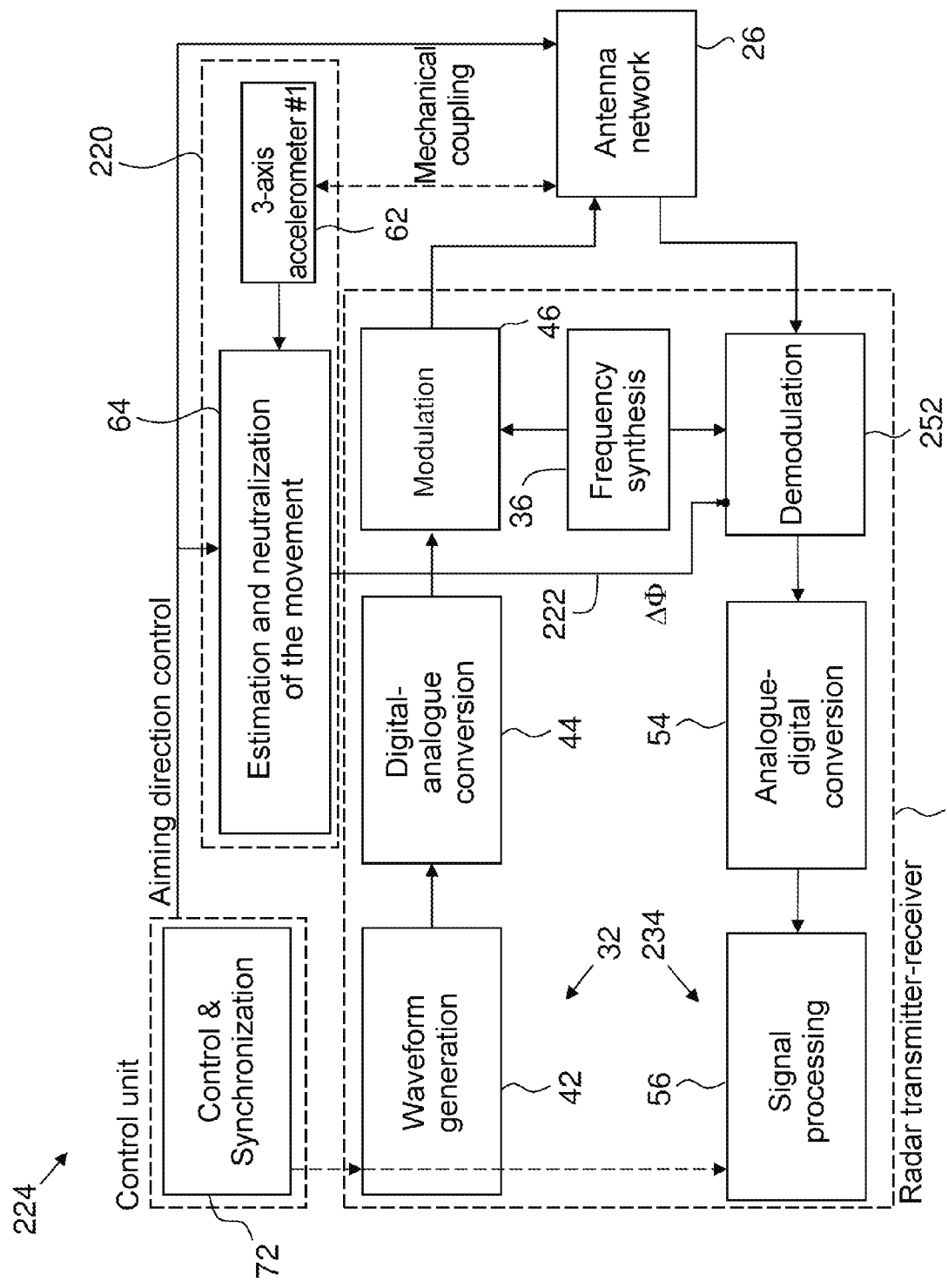
FIG. 7 is a view of the architecture of a monostatic airborne Doppler radar, incorporating a system according to a second embodiment of the invention.

According to FIG. 7 and a second embodiment, a system 220 for actively neutralizing the effect of the vibrations of a rotary-wing aircraft for Doppler radar is integrated into a monostatic Doppler radar 224 by being implemented in the reception chain 234 of the radar 224, and not in the transmission chain as described for the Doppler radar 24 of FIG. 3.

The active neutralization system 220 has an internal architecture identical to that of the active neutralization system 20 of FIG. 3, in that it comprises the same device for estimating and neutralizing the movement 64 and the same vibration sensor 62.

The active neutralization system 220 differs from the neutralization system 20 of FIG. 3 in that it comprises an output link 222 of the device for estimating and neutralizing the movement 64, connected to the demodulator 252 of the reception chain 234 of the radar 224.

The monostatic Doppler radar 224, which incorporates the active neutralization system 220, comprises a transmitter-receiver 222 that differs from that of FIG. 3 in that the demodulator 252 comprises, in its reception chain 234, an additional input 254 for receiving the compensation signal $\Delta\phi$ transmitted by the device for estimating and neutralizing 64 the movement of the phase centre O of the transmitting-receiving antenna 26.

Figure 8:
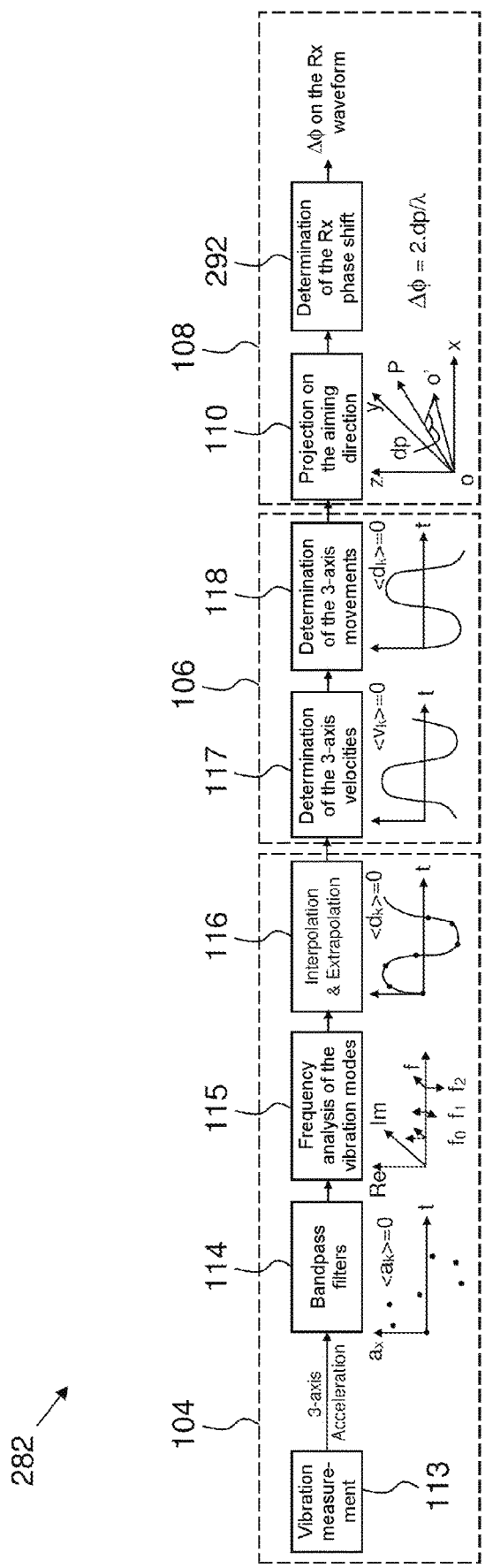
FIG. 8 is a view of a flow diagram of a method of active neutralization of the effect of the vibrations of a rotary-wing aircraft according to a second embodiment of the invention, implemented by the system for active neutralization of the vibrations described in FIG. 7.

According to FIG. 8, the active neutralization method 232, implemented by the active neutralization system 220 of FIG. 6, remains the same as the active neutralization method 102 of FIG. 4 in its sequence of steps 113, 114, 115, 116, 117, 118, 110 which lead to the determination of the compensation phase shift $\Delta\phi$, but differs from it in the step of determining the compensation phase shift in reception Rx 292, which replaces the step of determining the compensation phase shift in transmission Tx 112.

In the fifth step of determining the compensation phase shift in reception Rx 292, the compensation signal $\Delta\phi$ in reception Rx is calculated in the same manner as in the fifth step 112 of FIG. 4, but is transmitted to the demodulator 252 in the reception chain 234 and applied at the demodulator.

It should be noted that, as with the variant of the first embodiment of the active neutralization method and system, a variant of the second embodiment, applicable to a bistatic Doppler radar in place of a monostatic Doppler radar, may be envisaged. In this variant which is applied to a bistatic Doppler radar, a 3-axis accelerometer may be arranged to measure the phase centre of each of the two transmitting and receiving antennas. The compensation phase shift in reception at the demodulator is then calculated on the basis of the respective movements of the transmitting and receiving antennas.

Figure 9:
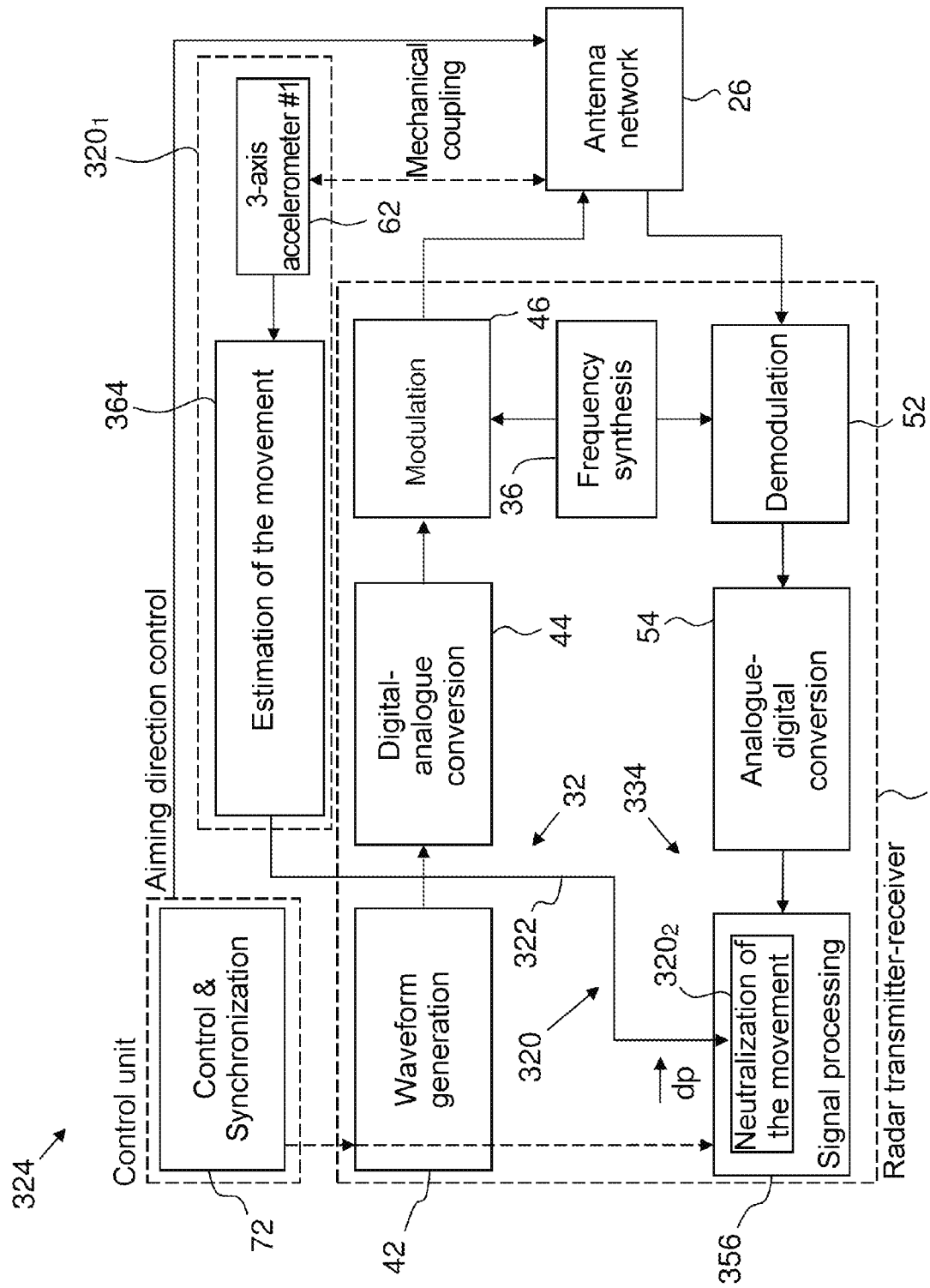
FIG. 9 is a view of the architecture of a monostatic airborne Doppler radar, incorporating a system according to a third embodiment of the invention.

According to FIG. 9 and a third embodiment, a system 320 for actively neutralizing the effect of the vibrations of a rotary-wing aircraft for Doppler radar, formed by two sub-systems $320_1$ and $320_2$ connected in series, is integrated into a monostatic Doppler radar 324 by being implemented in the Rx digital radar signal processing module 356 of the reception chain 234 of the radar 224, and not in the demodulator 252 of the reception chain 234 as described for the Doppler radar 224 of FIG. 7.

The active neutralization system 320 can thus be broken down into a first sub-system $320_1$ for measuring and estimating the components px, py, pz of the expected movement vector $\vec{dp}$ of the phase centre O of the transmitting-receiving antenna 26 and a second sub-system $320_2$ for neutralizing N estimated expected movements dp(j) associated with N different aiming directions of the receiving antenna, N being a predetermined whole number.

The first sub-system $320_1$ for estimating the vector of movement $\vec{dp}$ of the phase centre O of the transmitting-receiving antenna 26 is connected at its output 322 to an input 324 of the second neutralization sub-system $320_2$ by an internal link 326 in the transmitter-receiver 328.

The second neutralization sub-system $320_2$ is included in the digital radar signal processing module 356 of the reception chain and interposed between an upstream signal processing unit, followed by a unit for sorting the signals by their direction of arrival, connected to the ADC unit 54, and a downstream signal processing unit, the units within the digital radar signal processing module 356 not being shown, for the sake of simplicity.

The first sub-system $320_1$ for measuring and estimating the components px, py, pz of the expected movement vector $\vec{dp}$ of the phase centre O has an internal architecture identical to that of the active neutralization system 220 of FIG. 7, in that it comprises the same portion, designated by the reference numeral 364, of the device for estimating and neutralizing the movement 64, assigned to the steps of estimating the components px, py, pz of the movement vector $\vec{dp}$ in the reference frame of the transmitting-receiving antenna 26, and the same vibration sensor 62.

The active neutralization system 320 differs from the neutralization system 220 of FIG. 7 in that it is composed of a first sub-system $320_1$ for estimating the expected movement vector $\vec{dp}$ of the phase centre O, and of a neutralization sub-system $320_2$, interconnected with one another by an internal link in the transmitter-receiver 328.

Figure 10:
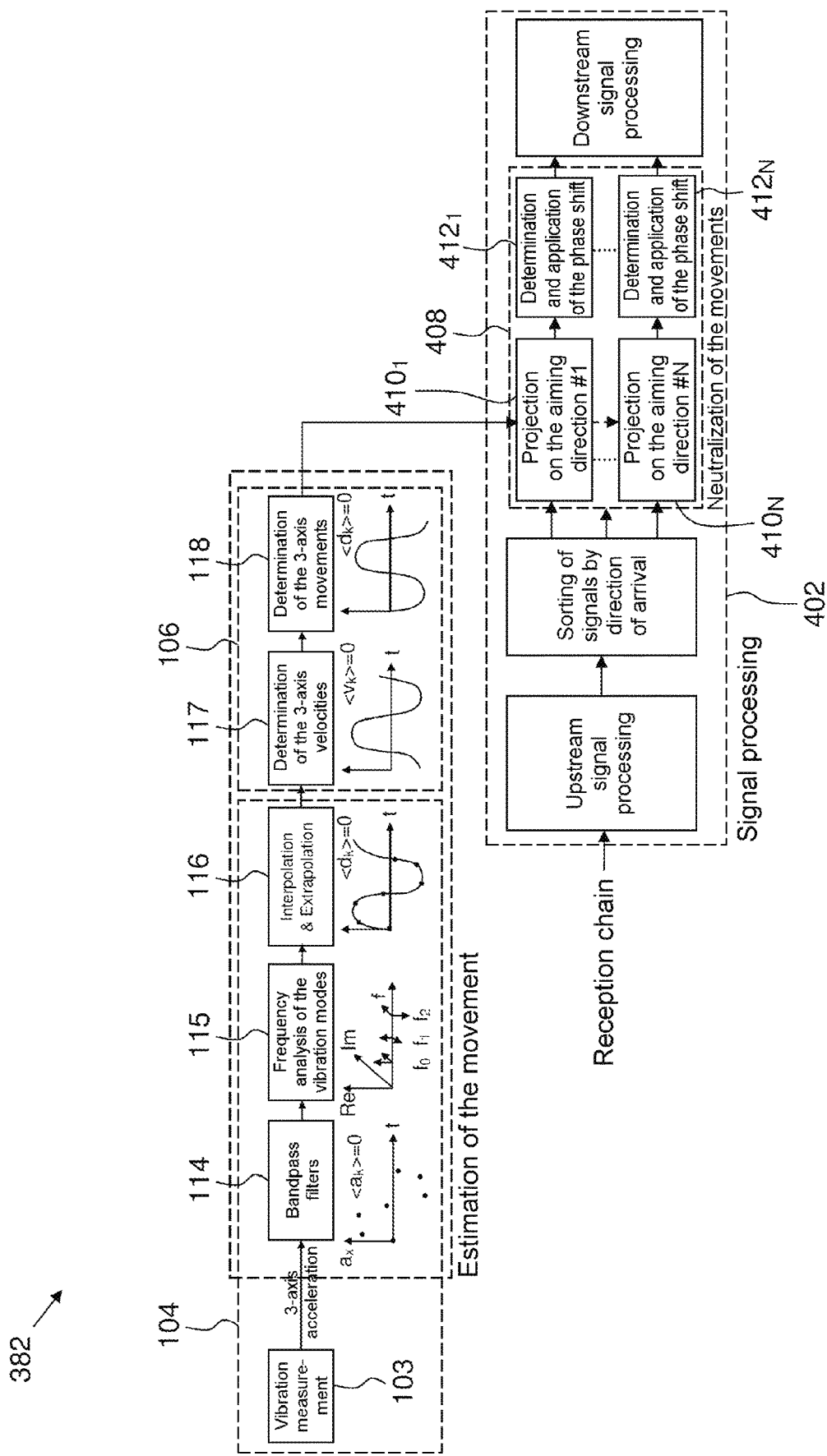
FIG. 10 is a view of a flow diagram of a method of active neutralization of the effect of the vibrations of a rotary-wing aircraft according to a third embodiment of the invention, implemented by the system for active neutralization of the vibrations described in FIG. 9.

According to FIG. 10, the active neutralization method 382, implemented by the active neutralization system 320 of FIG. 9, remains the same as the active neutralization method 102 of FIG. 4 in its sequence of steps 113, 114, 115, 116, 117, 118, which lead to the determination of the components px, py, pz of the vector of movement $\vec{dp}$ of the phase centre O in the reference frame of the antenna at rest X, Y, Z, but differs from it in that, the neutralization taking place in the digital processing, the vector of movement can be projected in a plurality of aiming directions by the processing carried out in parallel, $410_1, \ldots, 410_N$, corresponding to the fourth step. This has the advantage of being able to compensate subsequently, in steps $412_1, \ldots, 412_N$, for the effect of the vibrations in a plurality of directions simultaneously, which is useful for processing signals from antennas with a wide radiating pattern or with a plurality of lobes, such as network lobes for example. This technique also works in the conventional case of a directional antenna with a single direction of arrival (N being equal to 1).

It should be noted that, as with the variant of the first embodiment of the active neutralization method and system, a variant of the second embodiment, applicable to a bistatic Doppler radar in place of a monostatic Doppler radar, may be envisaged. In this variant which is applied to a bistatic Doppler radar, a 3-axis accelerometer may be arranged to measure the phase centre of each of the two transmitting and receiving antennas. The calculation of the compensation phase shift at the digital processing module is then carried out on the basis of the respective movements of the transmitting and receiving antennas.

The various embodiments of the active neutralization method and system according to the invention, described above, are based on the measurement of the vibrations as closely as possible to the phase centre O of the transmitting-receiving antenna in the case of a monostatic Doppler radar, or to the phase centre O1 of the transmitting antenna and to the reception phase centre in the case of a bistatic radar. The measurement of the acceleration along 3 axes in translation by one or two vibration sensors makes it possible to establish and anticipate the movements of the phase centre O of the transmitting-receiving antenna in the case of a monostatic Doppler radar, or the respective movements of the transmission phase centre O1 of the transmitting antenna and of the phase centre O2 of the receiving antenna in the case of a bistatic Doppler radar. By injecting compensation phase shifts generated by these movements during the generation of the radar waveform in transmission, or during the demodulation of the radar echoes in reception, or during the digital treatment of the radar echoes received after the demodulation, it is possible to neutralize the effects of the vibrations by anticipation.

It should be noted that those skilled in the art will have other available methods of interpolation, using for example a polynomial from among the set of Lagrange, Gauss, Bessel, Stirling et Newton polynomials. The interpolation may also be performed by splines or by using a Shannon reconstruction filter. Evidently, those skilled in the art could also consider replacing the frequency analysis and interpolation/extrapolation unit corresponding to an embodiment of the first step 104, in FIGS. 4, 8 and 10, with a Kalman filter in a first variant, or with a neural network in a second variant.

The invention claimed is:

1. A method for active neutralization of an effect of vibrations of a rotary-wing aircraft for a monostatic Doppler radar or a bistatic Doppler radar, the monostatic Doppler radar comprising:
   a transmitting-receiving radar antenna sharing a same phase centre O, and a radar transmission chain, connected to a transmission input of the transmitting-receiving radar antenna of the monostatic Doppler radar; and a radar reception chain, connected to a receiving output of the transmitting-receiving radar antenna of the monostatic Doppler radar, or the bistatic Doppler radar comprising:
a first transmitting radar antenna having a transmission phase centre O1 and a second receiving radar antenna, remote from the first transmitting radar antenna, having a reception phase centre O2;
a radar transmission chain, connected to a transmission input of the first transmitting radar antenna of the bistatic Doppler radar; and
a radar reception chain, connected to a reception output of the second receiving radar antenna of the bistatic Doppler radar; and
the active neutralization method being implemented by an active neutralization system comprising:
a three-dimensional vibration sensor for each of the first transmitting radar antenna and the second receiving radar antenna, fixed to said first transmitting radar antenna and the second receiving radar antenna, and at its phase centre O, O1, O2, or a single three-dimensional vibration sensor, shared by the first transmitting radar antenna and the second receiving radar antenna and at a phase centre O1, O2, when the first transmitting radar antenna and the second receiving radar antenna are strongly coupled mechanically; and
a device for estimating a movement of each three-dimensional vibration sensor and for neutralizing their movement, the active neutralization method being wherein it comprises:
a first step of measuring and temporally extrapolating vibration modes at the transmitting-receiving radar antenna or at the first transmitting radar antenna and at the second receiving radar antenna at their associated phase centre O, O1 and O2; then
a second step of estimating expected movements of the transmitting-receiving radar antenna or of the first transmitting radar antenna and of the second receiving radar antenna; and then
a third step of compensating for the expected movements of the first transmitting radar antenna in the radar transmission chain or of the second receiving radar antenna in the radar reception chain.

2. The active neutralization method according to claim 1, wherein:
the third step of compensating for the expected movements of the phase centre O;
O1, O2 comprises a fourth step of calculating at least one projection of movements in an aiming direction of the transmitting-receiving radar antenna or of the second receiving radar antenna; and
a fifth step of determining at least one compensation phase shift corresponding to an aiming direction.

3. The active neutralization method according to claim 1, wherein, for each measurement sensor:
the first step of measuring and temporally extrapolating the vibration modes of the three-dimensional vibration sensor comprises, executed successively, a sub-step of band-pass filtering of measured triaxial acceleration signals, a sub-step of complex frequency analysis of the vibration modes, and a sub-step of interpolation of acceleration profiles by image band filtering, and temporal extrapolation to immediately subsequent instants; and
the second step of estimating the expected movements comprises, executed successively, a sub-step of integration of accelerations into velocities and a sub-step of integration of the velocities into the expected movements.

4. The active neutralization method according to claim 1, further comprising a step of learning for each boresight axis, executed on the ground or in flight on known fixed beacons, and configured to provide a model for refining corrections to be applied in the radar transmission chain or in the radar reception chain, which allows for variations of vibrations correlated with an engine speed and a velocity of the rotary-wing aircraft.

5. The active neutralization method according to claim 1, wherein:
the monostatic Doppler radar is a monostatic radar comprising a transmitting-receiving radar antenna with the same phase centre O, and
the active neutralization system comprises a three-dimensional vibration sensor, fixed to the transmitting-receiving radar antenna and at its phase centre; and
the vibration modes of the transmitting-receiving radar antenna are measured by the three-dimensional vibration sensor in the first step of measurement and temporal extrapolation; and
the expected movements of the phase centre O of the transmitting-receiving radar antenna are estimated in the second step; and
the expected movements of the phase centre O of the transmitting-receiving radar antenna are compensated during a generation of a waveform in the radar transmission chain,
by calculating a projection of the expected movements of the phase centre O on an aiming direction of the transmitting-receiving radar antenna, then
by determining a compensation phase shift $\Delta\varphi$ corresponding to the aiming direction, equal to twice an amplitude dp of the expected movements divided by a wavelength $\lambda$ of a radar signal carrier.

6. The active neutralization method according to claim 5, wherein:
a step of learning for each boresight axis is executed on the ground or in flight on known fixed beacons, the learning step being configured to provide a model for refining corrections to be applied during a generation of a waveform in the radar transmission chain which allows for variations of vibrations correlated with an engine speed and a velocity of the rotary-wing aircraft.

7. The active neutralization method according to claim 5, comprising a step of detecting signals from jammers that are not correlated with vibrations of the rotary-wing aircraft, the step of detecting the signals from jammers being implemented in parallel with compensation for a radar echo received, correlated with movements of the first transmitting radar antenna or the second receiving radar antenna.

8. The active neutralization method according to claim 1, wherein:
the bistatic Doppler radar is a bistatic radar comprising a first transmitting radar antenna having a transmission phase centre O1 and a second receiving radar antenna, remote from the first transmitting radar antenna and having a reception phase centre O2;
the active neutralization system comprises a first three-dimensional vibration sensor, fixed to the first transmitting radar antenna and at its transmission phase centre O1, and a second three-dimensional vibration sensor, fixed to the second receiving radar antenna and at its reception phase centre O2;

the vibration modes of the first transmitting radar antenna and of the second receiving radar antenna respectively are measured, in the first step of measurement and temporal extrapolation, by the first three-dimensional vibration sensor and by the three-dimensional second vibration sensor respectively; and the expected movements of the transmission phase centre O1 of the first transmitting radar antenna and the expected movements of the reception phase centre O2 of the second receiving radar antenna are estimated in the second step; and the expected movements of the transmission phase centre O1 and of the reception phase centre O2 are compensated during a generation of a waveform in the radar transmission chain, by calculating a projection of the expected movements of the transmission phase centre on an aiming direction of the first transmitting radar antenna and the projection of the expected movements of a second reception phase centre on the aiming direction of the second receiving radar antenna; and then by determining a compensation phase shift $\Delta\varphi$ corresponding to respective aiming directions of the first transmitting radar antenna and of the second receiving radar antenna, on a basis of respective movements of the transmission phase centre and of the reception phase centre, and of a wavelength $\lambda$ of a radar signal carrier.

9. The active neutralization method according to claim 1, wherein:

the monostatic Doppler radar is a monostatic radar comprising a transmitting-receiving radar antenna with the same phase centre O, and the active neutralization system comprises a three-dimensional vibration sensor, fixed to the transmitting-receiving radar antenna and at its phase centre O; and the vibration modes of the radar antenna are measured by the three-dimensional vibration sensor in the first step of measurement and temporal extrapolation; and the expected movements of the phase centre O of the transmitting-receiving radar antenna are estimated in the second step; and the expected movements of the phase centre O of the transmitting-receiving radar antenna are compensated during a demodulation of a radar echo received in the radar reception chain, by calculating a projection of the expected movements of the phase centre O on an aiming direction of the transmitting-receiving radar antenna, then by determining a compensation phase shift $\Delta\varphi$ corresponding to the aiming direction, equal to twice an amplitude dp of the expected movements of the phase centre O corresponding to the aiming direction divided by a wavelength $\lambda$ of a radar signal carrier.

10. The active neutralization method according to claim 9, wherein:

a step of learning for each boresight axis is executed on the ground or in flight on known fixed beacons, the learning step being configured to provide a model for refining corrections to be applied during a demodulation of the radar echo received in the radar reception chain which allows for variations of vibrations correlated with an engine speed and a velocity of the rotary-wing aircraft.

11. The active neutralization method according to claim 9, wherein:

a step of learning for each boresight axis is executed on the ground or in flight on known fixed beacons, the learning step being configured to provide a model for refining corrections to be applied in a signal processing module of the radar reception chain for processing the radar echo received in the radar reception chain which allows for variations of vibrations correlated with an engine speed and a velocity of the rotary-wing aircraft.

12. The active neutralization method according to claim 1, wherein:

the bistatic Doppler radar is a bistatic radar comprising a first transmitting radar antenna having a transmission phase centre O1 and a second receiving radar antenna, remote from the first transmitting radar antenna and having a reception phase centre O2;

the active neutralization system comprises a first three-dimensional vibration sensor, fixed to the first transmitting radar antenna and at its transmission phase centre O1, and a second three-dimensional vibration sensor, fixed to the second receiving radar antenna and at its reception phase centre O2;

the vibration modes of the first transmitting radar antenna and of the second receiving radar antenna are measured, in the first step of measurement and temporal extrapolation, by the first three-dimensional vibration sensor and by the three-dimensional second vibration sensor respectively; and the expected movements of the transmission phase centre of the first transmitting radar antenna and the expected movements of the reception phase centre of the second receiving radar antenna are estimated in the second step; and the expected movements of the transmission phase centre and of the reception phase centre are compensated during a demodulation of a radar echo received in the radar reception chain, by calculating a projection of the expected movements of the transmission phase centre O1 on an aiming direction of the first transmitting radar antenna and the projection of the expected movements of the reception phase centre O2 on the aiming direction of the second receiving radar antenna; and then by determining a compensation phase shift $\Delta\varphi$ corresponding to respective aiming directions of the first transmitting radar antenna and of the second receiving radar antenna, on a basis of respective movements of the transmission phase centre O1 and of a second reception phase centre O2, and of a wavelength $\lambda$ of a radar signal carrier.

13. The active neutralization method according to claim 1, wherein:

the monostatic Doppler radar is a monostatic radar comprising a transmitting-receiving radar antenna with the same phase centre O, and the active neutralization system comprises a first sub-system for measuring and estimating components of an expected movement vector of the phase centre O of the transmitting-receiving radar antenna, including the three-dimensional vibration sensor, and, in series, a second sub-system for neutralizing a predetermined whole number N of estimated expected movements dp(j) of the phase centre O, associated with N aiming directions in a reception mode of the transmitting-receiving radar antenna, included in a signal processing module for processing a demodulated and digitized signal from the radar reception chain; and the vibration modes of the transmitting-receiving radar antenna are measured by the three-dimensional vibration sensor in the first step of measurement and temporal extrapolation; and the expected movements of the phase centre O of the transmitting-receiving radar antenna are estimated in the second step; and the expected movements of the phase centre of the transmitting-receiving radar antenna are compensated in the signal processing module for processing the demodulated and digitized signal from the radar reception chain, by calculating a projection of the expected movements of the phase centre O on the N aiming directions of the transmitting-receiving radar antenna, then by determining, for each of the N aiming directions of the transmitting-receiving radar antenna in reception mode, an associated compensation phase shift $\Delta\varphi$ which is a function on an amplitude dp of the expected movements of the phase centre corresponding to an aiming direction and a wavelength $\lambda$ of a radar signal carrier.

14. The active neutralization method according to claim 1, wherein:

the bistatic Doppler radar is a bistatic radar comprising a first transmitting radar antenna having a transmission phase centre O1 and a second receiving radar antenna, remote from the first transmitting radar antenna and having a reception phase centre O2;

the active neutralization system comprises a first subsystem for measuring and estimating components of an expected movement vector of the phase centre O1 of the first transmitting radar antenna and the components of the expected movement vector of the phase centre O2 of the second receiving radar antenna, including first and second three-dimensional vibration sensors, and, in series, a second sub-system for neutralizing a predetermined whole number N of estimated expected movements of the reception phase centre O2, associated with N aiming directions in a reception mode of the second receiving radar antenna, and of the estimated expected movements of a transmission phase centre phase centre O1, associated with an aiming direction in the reception mode of the first transmitting radar antenna, included in a signal processing module for processing a demodulated and digitized signal from the radar reception chain;

the vibration modes of the first transmitting radar antenna and of the second receiving radar antenna, respectively, are measured, in the first step of measurement and temporal extrapolation, by the first three-dimensional vibration sensor and the second three-dimensional vibration sensor respectively;

the expected movements of the transmission phase centre O1 of the first transmitting radar antenna and the expected movements of the reception phase centre O2 of the second receiving radar antenna are estimated in the second step; and the expected movements of the transmission phase centre O1 and of the reception phase centre O2 are compensated in the signal processing module for processing the demodulated and digitized signal from the radar reception chain, by calculating a projection of the expected movements of the transmission phase centre O1 on a transmission aiming direction of the first transmitting radar antenna and the projection of the expected movements of the reception phase centre O2 on the N aiming directions of the second receiving radar antenna; and then by determining, for each of the N aiming directions of the transmitting-receiving radar antenna in reception mode, an associated compensation phase shift $\Delta\varphi$ which is a function of an amplitude dp of the expected movements of the reception phase centre O2 corresponding to the aiming direction, of an amplitude of the expected movements of the transmission phase centre O1, and of a wavelength $\Delta$ of a radar signal carrier.

15. A system for active neutralization of an effect of vibrations of a rotary-wing aircraft for a monostatic Doppler radar or a bistatic Doppler radar, the monostatic Doppler radar comprising:

a transmitting-receiving radar antenna sharing a same phase centre O, and a radar transmission chain, connected to a transmission input of the transmitting-receiving radar antenna of the monostatic Doppler radar; and a radar reception chain, connected to a receiving output of the transmitting-receiving radar antenna of the monostatic Doppler radar, or the bistatic Doppler radar comprising:

a first transmitting radar antenna having a transmission phase centre O1 and a second receiving radar antenna, remote from the first transmitting radar antenna, having a reception phase centre O2;

a radar transmission chain, connected to a transmission input of the first transmitting radar antenna of the bistatic Doppler radar;

a radar reception chain, connected to a reception output of the second receiving radar antenna of the bistatic Doppler radar; and the system for active neutralization of the effect of vibrations of a rotary-wing aircraft for a monostatic Doppler radar or a bistatic radar being wherein it comprises:

at least one three-dimensional vibration sensor for each first transmitting/second receiving radar antenna, fixed to said first transmitting radar antenna and the second receiving radar antenna and at its phase centre O, O1 and O2, and a device for estimating movements of each at least one three-dimensional vibration sensor and for neutralizing their movement, the at least one three-dimensional vibration sensor and the device for estimating the movements of each at least one three-dimensional vibration sensor and for neutralizing their movement being configured for:

in a first step, measuring and temporally extrapolating vibration modes at the transmitting-receiving radar antenna or at the first transmitting radar antenna and the second receiving radar antenna at their associated phase centre; then in a second step, estimating expected movements of the transmitting-receiving radar antenna or of the first transmitting radar antenna and the second receiving radar antenna; and then in a third step, compensating for the expected movements of the first transmitting radar antenna in the radar transmission chain or of the second receiving radar antenna in the receiving chain.

16. The system for active neutralization according to claim 15, wherein:

the device for estimating the movements of each at least one three-dimensional vibration sensor and for neutralizing their movement is configured, in the third step of compensating the expected movements, for:

calculating at least one projection of the expected movements in an aiming direction of the transmitting-receiving radar antenna or of the second receiving radar antenna, and then determining at least one compensation phase shift in the radar transmission chain or in the radar reception chain corresponding to an aiming direction.

17. The system for active neutralization according to claim 15, wherein the device for estimating the movements of each at least one three-dimensional vibration sensor and for neutralizing their movement is configured for:

in the first step of measuring and temporally extrapolating the vibration modes of a vibration sensor, implementing:

bandpass filtering of measured triaxial acceleration signals, then complex frequency analysis of the vibration modes, then interpolation of acceleration profiles for each filtering of image bands, then temporal extrapolation to immediately subsequent instants of interpolated accelerations; and in the second step of estimating the expected movements, implementing:

integration of expected accelerations into expected velocities, then integration of the expected velocities into expected movements.

18. The system for active neutralization according to claim 15, wherein the device for estimating the movements of each at least one three-dimensional vibration sensor and for neutralizing their movement is also configured for implementing a learning step for each boresight axis, executed on the ground or in flight on known fixed beacons, wherein a model is calculated for refining corrections to be applied in the radar transmission chain or in the radar reception chain, the model allowing for variations of vibrations correlated with an engine speed and a velocity of the rotary-wing aircraft.

* * * * *